United States Patent
Chuang et al.

(10) Patent No.: US 8,323,842 B2
(45) Date of Patent: Dec. 4, 2012

(54) FUEL CELL WITH ANODE AND CATHODE PLATE TEMPERATURE DIFFERENCE

(75) Inventors: Po-Ya Abel Chuang, Victor, NY (US); Wenbin Gu, Pittsford (NA); Scott G. Smith, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 543 days.

(21) Appl. No.: 12/567,842

(22) Filed: Sep. 28, 2009

(65) Prior Publication Data

US 2011/0076583 A1    Mar. 31, 2011

(51) Int. Cl.
*H01M 8/04* (2006.01)

(52) U.S. Cl. ........................................ 429/442; 429/518

(58) Field of Classification Search ............... 429/11, 429/442, 518
See application file for complete search history.

(56) References Cited

U.S. PATENT DOCUMENTS

| | | | | |
|---|---|---|---|---|
| 5,310,608 | A | * | 5/1994 | Ishizawa et al. ............. 429/11 |
| 7,419,739 | B2 | * | 9/2008 | Lai ............................. 429/483 |
| 2005/0244700 | A1 | * | 11/2005 | Abd Elhamid et al. ...... 429/34 |
| 2005/0271927 | A1 | | 12/2005 | Breault |

* cited by examiner

*Primary Examiner* — Stephen J. Kalafut
(74) *Attorney, Agent, or Firm* — Dinsmore & Shohl LLP

(57) ABSTRACT

A method of operating a fuel cell is described. The method includes controlling the temperature of the anode plate and the temperature of the cathode plate to obtain a temperature difference of at least about 2° C. between the anode plate and the cathode plate. A fuel cell is also described.

20 Claims, 4 Drawing Sheets

FUEL CELL WITH ANODE AND CATHODE PLATE TEMPERATURE DIFFERENCE

The invention relates generally to fuel cells and to methods of operating them.

BACKGROUND OF THE INVENTION

Electrochemical conversion cells, commonly referred to as fuel cells, which produce electrical energy by processing first and second reactants, e.g., through oxidation and reduction of hydrogen and oxygen. By way of illustration and not limitation, a typical polymer electrolyte fuel cell comprises a polymer membrane (e.g., a proton exchange membrane) that is positioned between a pair of gas diffusion media layers and catalyst layers. A cathode plate and an anode plate are positioned at the outermost sides adjacent the gas diffusion media layers, and the preceding components are tightly compressed to form the cell unit.

The voltage provided by a single cell unit is typically too small for useful applications. Accordingly, a plurality of cells are typically arranged and connected consecutively in a "stack" to increase the electrical output of the electrochemical conversion assembly or fuel cell.

The catalyst layers can be made of nanostructured thin support materials. The nanostructured thin support materials have particles or thin films of catalyst on them. The nanostructure thin catalytic layers can be made using well known methods. One example is nanostructured thin film (NSTF) catalyst layers available from 3M. The nanostructured thin catalytic layers can be transferred directly to a proton exchange membrane, such as a Nafion® membrane, using a hot press lamination process, for example. The polyimide substrate is then peeled off, leaving the layer of whiskers attached to the membrane.

These types of nanostructured thin catalytic layers have demonstrated high catalytic activities, which is helpful to reduce the platinum utilization in fuel cell stacks. Most importantly, because the supporting layer is not made of carbon as in the traditional platinum catalysts for fuel cell application, the nanostructured thin catalytic layers are more resistant to corrosion under certain fuel cell operating conditions, and thus improve the fuel cell's durability.

However, an MEA made with this type of whisker catalyst layer is very sensitive to water management and has a narrow range of operating conditions (i.e., it cannot be too dry or too wet) to provide good performance. If the fuel cell is operated under wet conditions, the thin layer of whiskers, which is less than 1 μm thick, cannot provide enough storage capacity for the product water, resulting in flooding. Under dry conditions, it is believed that not all portions of the whiskers are utilized to catalyze the reaction due to poor proton transfer characteristics.

Therefore, there is a need for a method of operating a fuel cell which can provide good performance over a wider range of operating conditions.

SUMMARY OF THE INVENTION

The present invention meets this need. One aspect of the invention involves a method of operating a fuel cell. The method includes providing a fuel cell comprising: a membrane; a pair of catalyst layers on opposites sides of the membrane; a porous anode substrate adjacent to one of the catalyst layers a porous cathode substrate adjacent to the second catalyst layer, the porous anode substrate and the porous cathode substrate on opposite sides of the membrane; an anode plate having flow channels therein adjacent to the porous anode substrate; and a cathode plate having flow channels therein adjacent to the porous cathode substrate, the anode plate and the cathode plate on opposite sides of the membrane; and controlling a temperature of the anode plate and a temperature of the cathode plate to obtain a temperature difference of at least about 2° C. between the anode plate and the cathode plate.

Another aspect of the invention involves a fuel cell. The fuel cell includes a membrane; a pair of catalyst layers on opposites sides of the membrane; a porous anode substrate adjacent to one of the catalyst layers; a porous cathode substrate adjacent to the second catalyst layer, the porous anode substrate and the porous cathode substrate on opposite sides of the membrane; an anode plate having flow channels therein adjacent to the porous anode substrate; and a cathode plate having flow channels therein adjacent to the porous cathode substrate, the anode plate and the cathode plate on opposite sides of the membrane; wherein there is a temperature difference of at least about 2° C. between the anode plate and the cathode plate.

DETAILED DESCRIPTION OF THE INVENTION

Figure 1:
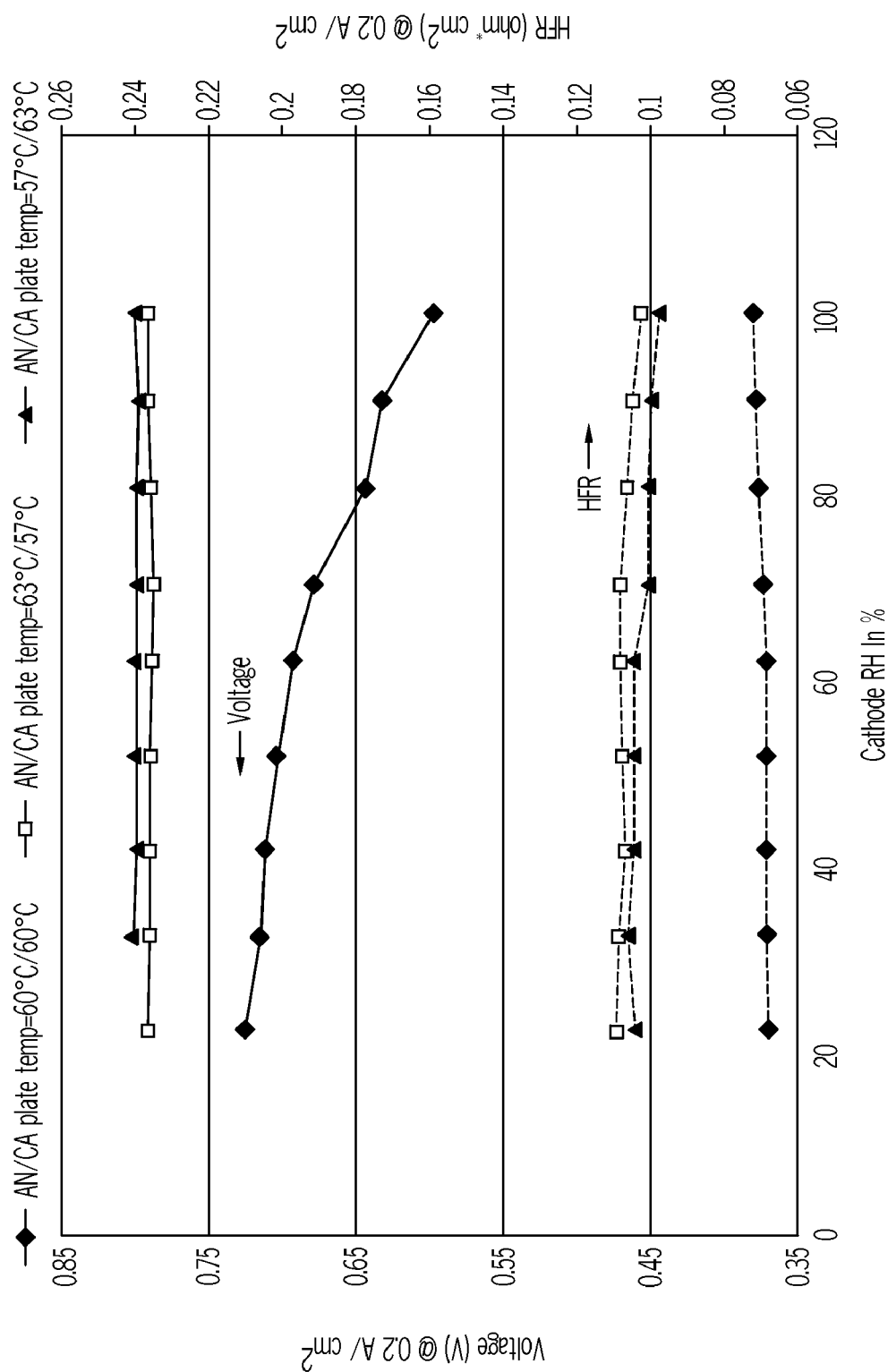
FIG. 1 is a graph showing the voltage and HFR of a fuel cell as a function of cathode relative humidity.

The fuel cell performance and relative humidity robustness were improved for electrodes having nanostructured thin catalytic layers by running the fuel cell so that there was a temperature difference between the anode and the cathode. In addition, operation with the temperature difference allowed active control of the water movement in the fuel cell.

The performance improvement will apply with MEAs that are sensitive to liquid water management, such as NSTF layers. The water balance improvement will apply to all electrodes.

There are numerous ways to create a temperature difference across the cell. For example, with a single cell, the cell can be heated and/or cooled non-symmetrically between the anode side and the cathode side to create a thermal gradient. For example, either the anode or the cathode could be heated or cooled to obtain the temperature difference. Alternatively, one side could be heated, while the other side is cooled.

With fuel cell stacks, it can be more difficult to achieve a thermal gradient within a cell, and the costs associated with such changes will vary. For instance, the design of the cooling channels for the anode and cathode can be changed by either increasing or decreasing the channels to increase or decrease the amount of cooling so that a thermal gradient results. Alternatively, the geometry or stack design for dual cooling loops in one side of the cell could be changed. Lower cost options include, but are not limited to, cooling every other plate, appropriate selection of DM or plate materials having different thermal properties for the anode or cathode or both, and applying a thermally resistive coating to the anode or cathode or both (with different thermal resistance).

With a fuel cell stack, when every other plate is cooled or heated, the temperature difference will vary from the anode being hotter in one cell to the cathode being hotter in the next cell.

Obtaining the temperature difference could be accomplished simply by blocking the cooling channels in every other plate, or by redesigning the plate geometry.

A thermally resistive material could be applied to one plate or the other. Thermally resistive materials include, but are not limited to, nonmetals such as glass or polymer. Alternatively, thermally resistive materials having different thermal resistance could be applied to both the anode and the cathode.

A thermal gradient can be achieved by proper selection of the materials for the anode, cathode, and DM. These materials can be chosen to have different thermal resistances, which would lead to a temperature gradient across the cell.

The various approaches for creating a temperature gradient can be used either alone or in combination with other approaches.

The performance of a fuel cell run so that the temperature of the anode and the cathode were the same was compared to the performance when there was temperature difference between the two.

Normal diffusion media (Grafil U-105, Mitsubishi Rayon, Tokyo, Japan) were used with an NSTF electrode (3M standard NSTF electrode with 0.1 mg Pt/cm$^2$ loading on the anode and 0.15 mg Pt/cm$^2$ loading on the cathode) and homogeneous PFSA membrane (3M standard homogenous perfluorosulfonic acid (PFSA) membrane 32 micron in thickness). A single cell was used (i.e., anode plate/DM/NSTF MEA/DM/cathode plate). Normal operating protocols were run to obtain the performance curve. The plate temperature was controlled using a separate heater and a cooling fan. Significant performance improvement was observed with the NSTF MEA.

FIG. 1 shows the results at 60° C. and 0.2 A/cm$^2$ with the anode at 50% relative humidity (RH), anode and cathode outlet pressure of 50 kPa, the stoichometry of the anode hydrogen of 1.5 and the stoichometry of the cathode oxygen of 2. As FIG. 1 demonstrates, when there was a temperature difference of 6° C. between the anode and cathode, the cell voltage was higher than when they were the same temperature, as was the HFR (high frequency resistance). HFR measures the proton resistance in the membrane and the electron resistances in the diffusion media and plate. Typically the electrical resistance remains the same, or does not change much) during operation. Therefore, HFR can be used to indicate the resistance of the proton transport in the membrane. The higher the HFR, the dryer the membrane is. In addition, when the temperatures were the same, the voltage decreased as a function of cathode RH, while it remained constant when there was a temperature difference between the two.

Figure 2:
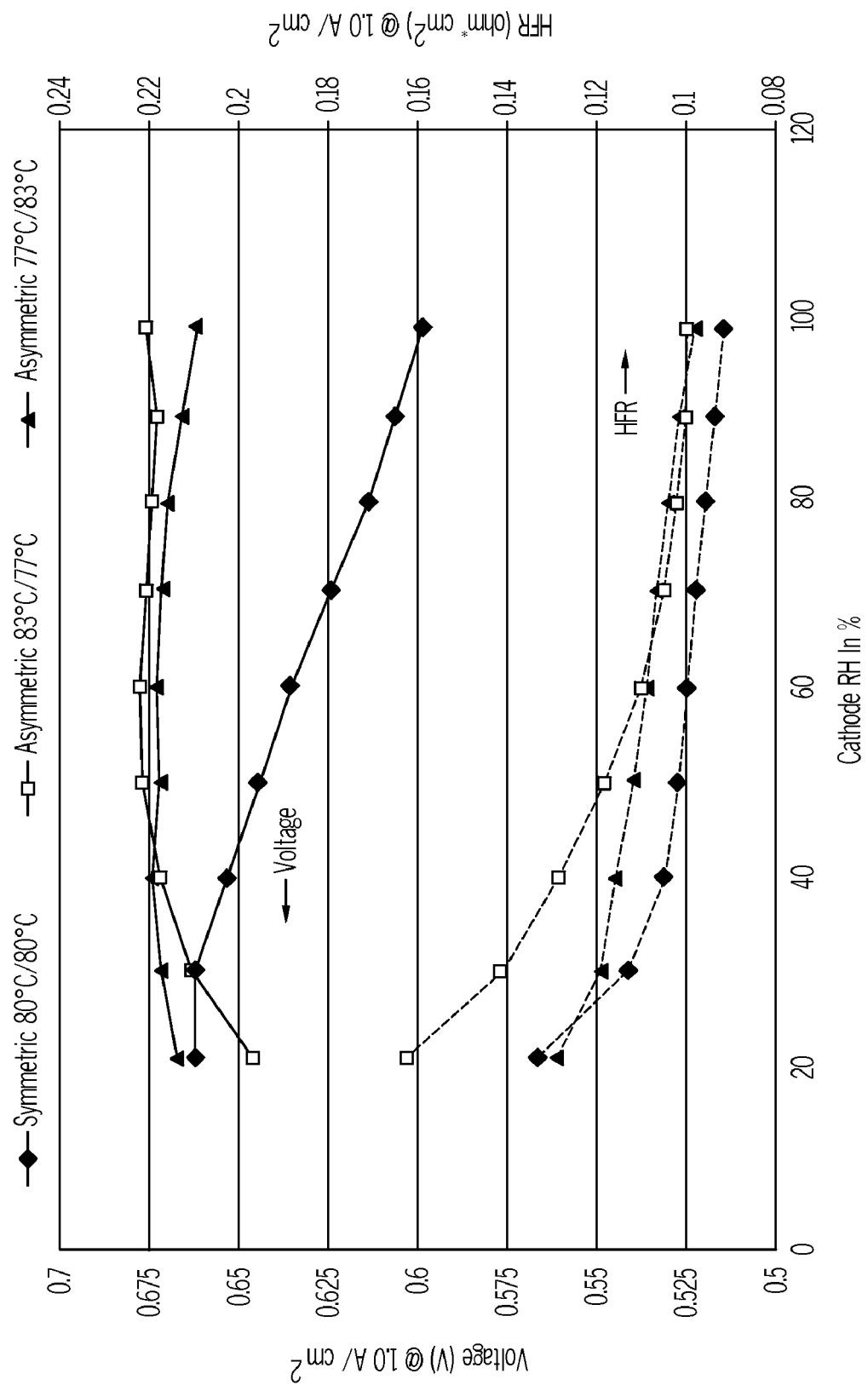
FIG. 2 is a graph showing the voltage and HFR of a fuel cell as a function of cathode relative humidity.

The test was repeated at higher temperature (80° C.) and higher current density (1.0 A/cm$^2$), as shown in FIG. 2. Again, the voltage and HFR were higher when there was a 6° C. temperature difference between the anode and cathode than when they were the same temperature. The voltage dropped as a function of cathode RH when the temperatures were the same. With the temperature difference, there was a slight variation, but the voltage was significantly higher than that when the temperatures were the same.

Figure 3:
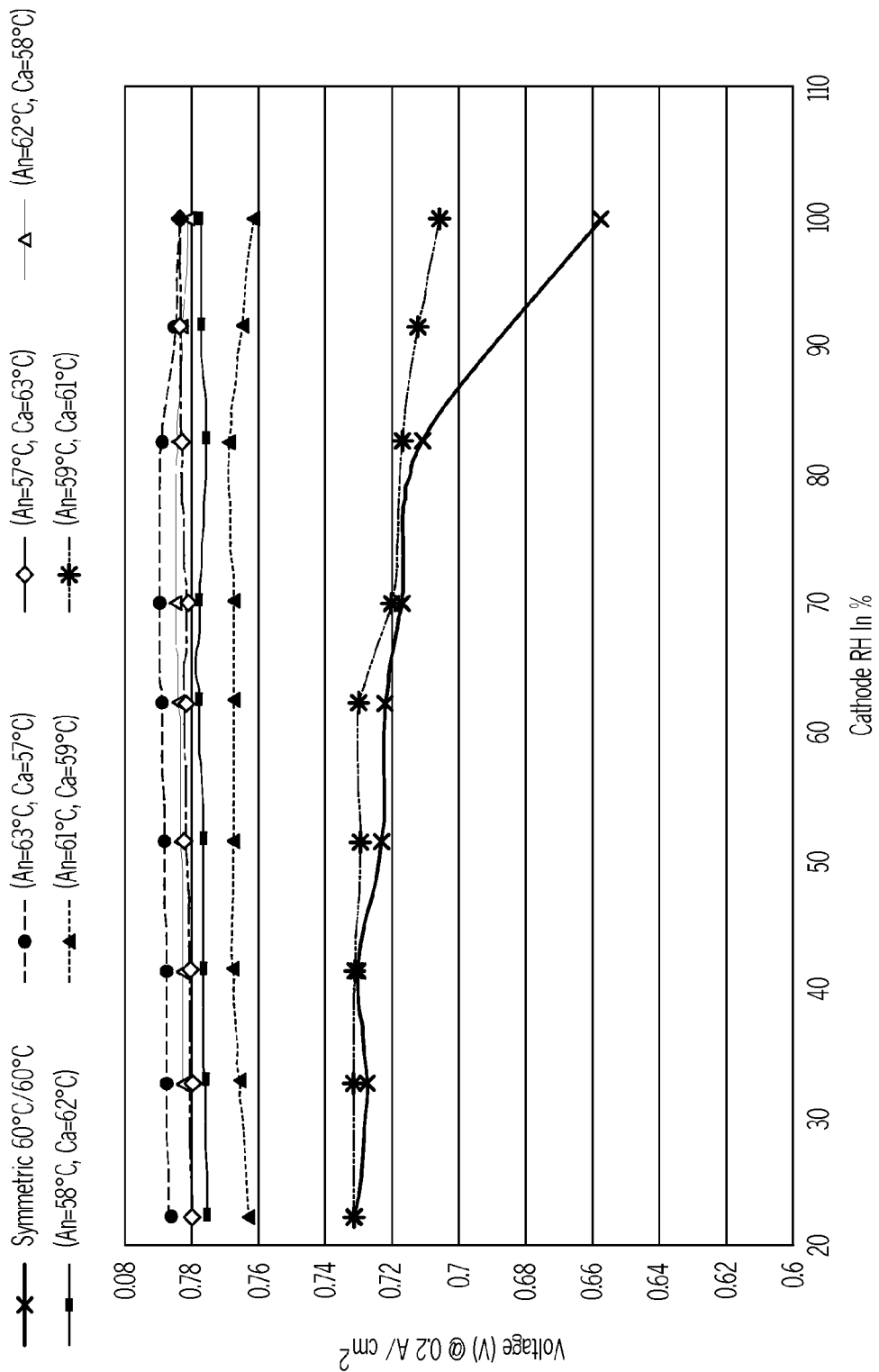
FIG. 3 is a graph showing the voltage of a fuel cell as a function of cathode relative humidity.

Similar benefits were observed with temperature difference of 4° C. at 60° C. and 0.2 A/cm$^2$, as shown in FIG. 3. For the 2° C. temperature difference, having the anode at the higher temperature provided greater improvement than when the cathode was at the higher temperature. The improvement for a 2° C. temperature difference was less than for either a 4° C. or 6° C. temperature difference. The voltage decrease for the same temperature was much greater than for either 4° C. or 6° C. For the 2° C. difference with the anode being higher, the voltage was slightly lower than that for the 4° C. or 6° C. difference. The 2° C. difference with the cathode being higher, the voltage was similar to the same temperature, but the decrease as a function of cathode RH was less.

In order to evaluate the movement of water in the cell with confidence, the cell was kept at high current density (either 1.0 or 1.5 A/cm$^2$) for about 2 hr. The exit water was collected and measured.

Figure 4A:
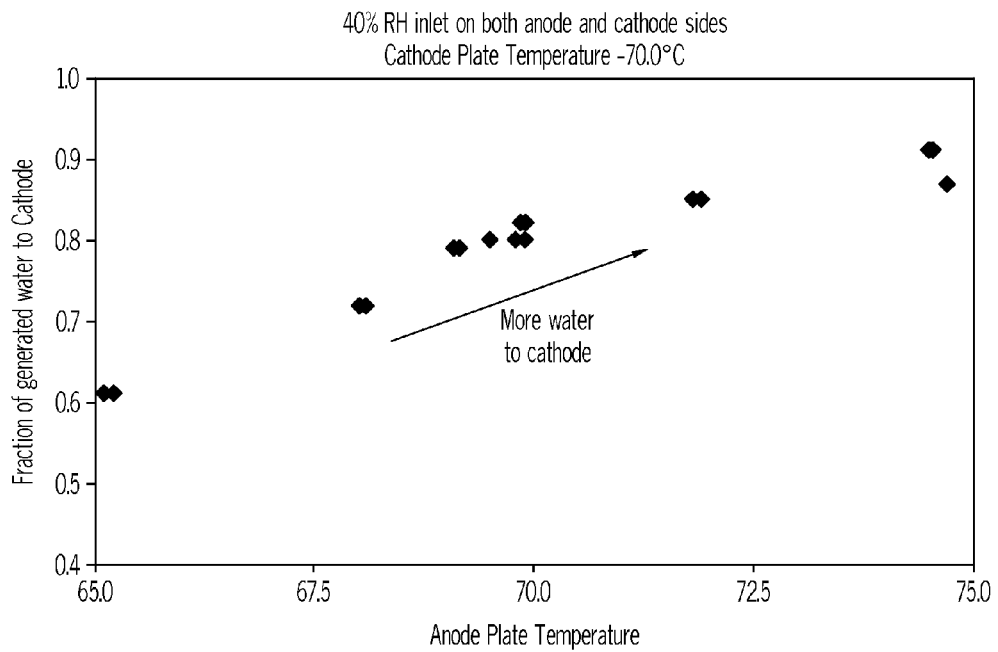
FIGS. 4A-B are graphs showing the fraction of water generated going to the cathode as a function of anode plate temperature.
Figure 4B:
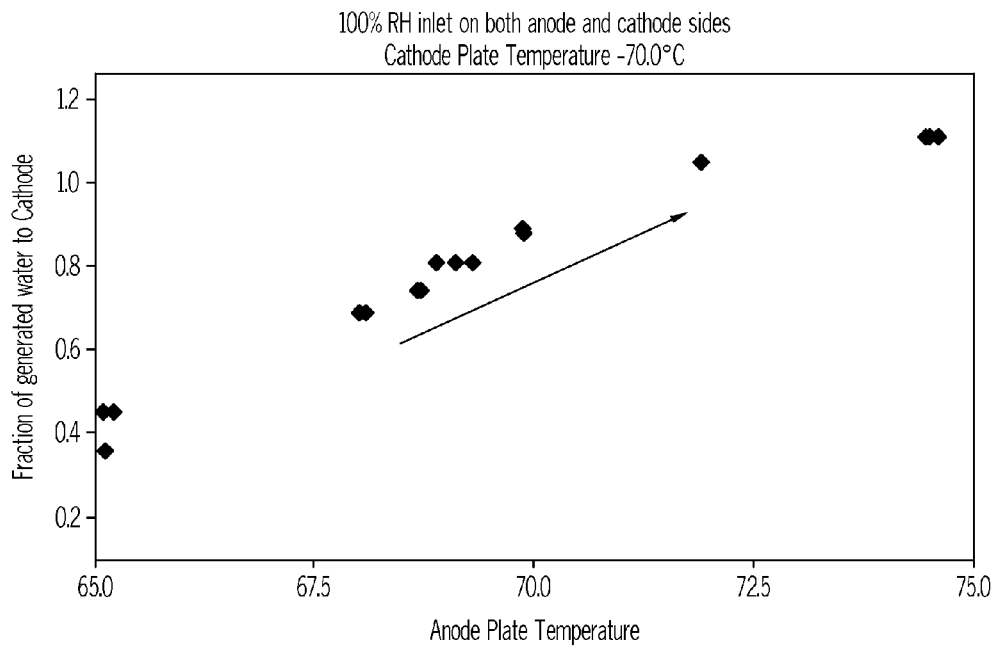

FIGS. 4A-B show the fraction of generated water that exited from the cathode at a dry operating condition (40% RH inlet) and a wet operating condition (100% RH). When the anode and cathode temperature are the same (70° C.), about 80% of the generated water goes to the cathode side because the water is generated at the cathode electrode. When the anode temperature is higher than the cathode temperature, more than 80% of the generated water goes to the cathode. If the anode temperature is high enough, then the generated water can be more than 100%, which means that all of the water generated goes to the cathode, as well as some of the water coming in from the anode inlet. Conversely, if the anode temperature is less than the cathode temperature, then less than 80% of the water generated goes to the cathode. Thus, the liquid water moves toward the cold side of the cell. This allows different cooling control design so that the water will go to one side or the other, as desired. This movement of water will occur with all membrane electrode assemblies including NSTF and Pt/C if there is a temperature difference between the anode and the cathode.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating a fuel cell comprising:
providing a fuel cell comprising
   a membrane;
   a pair of catalyst layers on opposites sides of the membrane;
   a porous anode substrate adjacent to one of the catalyst layers;
   a porous cathode substrate adjacent to the second catalyst layer, the porous anode substrate and the porous cathode substrate on opposite sides of the membrane;
   an anode plate having flow channels therein adjacent to the porous anode substrate; and
   a cathode plate having flow channels therein adjacent to the porous cathode substrate, the anode plate and the cathode plate on opposite sides of the membrane; and
controlling a temperature of the anode plate or a temperature of the cathode plate to obtain a temperature difference of at least about 2° C. between the anode plate and the cathode plate.

2. The method of claim 1 wherein controlling the temperature of the anode plate or the cathode plate comprises heating the anode plate or the cathode plate, or cooling the anode plate or the cathode plate, or heating one of the anode plate or the cathode plate and cooling the other of the anode plate or the cathode plate.

3. The method of claim 1 wherein controlling the temperature of the anode plate or the cathode plate comprises providing a coolant to the anode plate having a temperature and providing a coolant to the cathode plate having a temperature, the temperature of the anode coolant being different from the temperature of the cathode coolant.

4. The method of claim 1 wherein controlling the temperature of the anode plate or the cathode plate comprises providing a coolant to the anode plate and a coolant to the cathode plate, wherein the coolant for the anode plate has a different cooling capacity from the coolant for the cathode plate.

5. The method of claim 1 wherein controlling the temperature of the anode plate or the cathode plate comprises providing a different coolant flow path for the anode plate and the cathode plate.

6. The method of claim 1 wherein controlling the temperature of the anode plate and the cathode plate comprises coating a thermally resistive material on at least one of the anode plate or the cathode plate so that a thermal resistance of the anode plate is different from a thermal resistance of the cathode plate.

7. The method of claim 1 wherein controlling the temperature of the anode plate and the cathode plate comprises: providing the anode plate made of a material having a thermal resistance and providing the cathode plate made of a material having a thermal resistance, the thermal resistance of the anode plate being different from the thermal resistance of the cathode plate; or providing the anode substrate made of a material having a thermal resistance and providing the cathode substrate made of a material having a thermal resistance, the thermal resistance of the anode substrate being different from the thermal resistance of the cathode substrate; or both.

8. The method of claim 1 wherein controlling the temperature of the anode plate and the cathode plate comprises providing a reduced coolant flow to the anode plate or the cathode plate.

9. The method of claim 1 wherein the temperature of the anode plate is higher than the temperature of the cathode plate.

10. The method of claim 1 wherein the temperature of the cathode plate is higher than the temperature of the anode plate.

11. The method of claim 1 wherein the temperature difference is at least about 4° C. between the anode plate and the cathode plate.

12. The method of claim 1 wherein the temperature difference is at least about 6° C. between the anode plate and the cathode plate.

13. A humidity-balanced fuel cell comprising:
   a membrane with a pair of nanostructured thin catalytic layers formed on opposites sides thereof;
   a porous anode substrate adjacent to one of the nanostructured thin catalytic layers;
   a porous cathode substrate adjacent to the second nanostructured thin catalytic layer, the porous anode substrate and the porous cathode substrate on opposite sides of the membrane;
   an anode plate having flow channels therein adjacent to the porous anode substrate; and
   a cathode plate having flow channels therein adjacent to the porous cathode substrate, the anode plate and the cathode plate on opposite sides of the membrane such that during operation of the fuel cell, a temperature difference of at least about 2° C. is substantially maintained between the anode plate and the cathode plate during operation of the fuel cell as a way to promote said humidity balance between said porous anode substrate and said porous cathode substrate.

14. The fuel cell of claim 13 wherein the temperature difference is at least about 4° C. between the anode plate and the cathode plate.

15. The fuel cell of claim 13 wherein the temperature difference is at least about 6° C. between the anode plate and the cathode plate.

16. The fuel cell of claim 13 wherein a temperature of the anode plate is higher than a temperature of the cathode.

17. The fuel cell of claim 13 wherein a temperature of the cathode is higher than a temperature of the anode.

18. The fuel cell of claim 13 wherein at least one of the anode plate or cathode plate has a thermally resistive layer thereon.

19. The fuel cell of claim 13 wherein the anode plate and the cathode plate are made of materials having a different thermal resistance; or the anode substrate and the cathode substrate are made of materials having a different thermal resistance; or both.

20. The fuel cell of claim 13 wherein a coolant flow path of the anode plate is different from a coolant flow path of the cathode plate.

* * * * *